(12) United States Patent
Little et al.

(10) Patent No.: US 6,430,333 B1
(45) Date of Patent: Aug. 6, 2002

(54) MONOLITHIC 2D OPTICAL SWITCH AND METHOD OF FABRICATION

(75) Inventors: Michael J. Little, Oak Park; Andrei M. Shkel, Irvine, both of CA (US)

(73) Assignee: Solus Micro Technologies, Inc., Westlake Village, CA (US)

( * ) Notice: Subject to any disclaimer, the term of this patent is extended or adjusted under 35 U.S.C. 154(b) by 0 days.

(21) Appl. No.: 09/550,077

(22) Filed: Apr. 14, 2000

Related U.S. Application Data

(60) Provisional application No. 60/129,337, filed on Apr. 15, 1999.

(51) Int. Cl.[7] .............................. G02B 6/26; H01L 21/70
(52) U.S. Cl. .............................. 385/18; 385/15; 385/16; 385/17; 385/25; 385/14; 385/40; 437/51; 437/54
(58) Field of Search ............................. 385/15, 16, 17, 385/18, 14, 25, 40; 437/51, 131, 54

(56) References Cited

U.S. PATENT DOCUMENTS

| 5,414,819 | A | * | 5/1995 | Redmond et al. ........... 395/325 |
| 5,546,209 | A | * | 8/1996 | Willner et al. ............... 359/115 |
| 5,661,591 | A | * | 8/1997 | Lin et al. ..................... 359/200 |
| 5,781,331 | A | * | 7/1998 | Carr et al. .................... 359/288 |
| 5,796,152 | A | * | 8/1998 | Carr et al. .................... 257/415 |
| 6,097,859 | A | * | 8/2000 | Solgaard et al. .............. 385/17 |
| 6,175,443 | B1 | * | 1/2001 | Aksyuk et al. ............. 359/291 |
| 6,212,309 | B1 | * | 4/2001 | Nguyen et al. ............... 385/17 |
| 6,253,001 | B1 | * | 6/2001 | Hoen .......................... 385/17 |
| 6,289,145 | B1 | * | 9/2001 | Solgaard et al. .............. 385/17 |
| 6,300,665 | B1 | * | 10/2001 | Peeters et al. .............. 257/415 |
| 6,330,102 | B1 | * | 12/2001 | Daneman et al. ........... 359/290 |

* cited by examiner

Primary Examiner—Brian Healy
(74) Attorney, Agent, or Firm—Fleshner & Kim, LLP

(57) ABSTRACT

A sequence of MEMS processing steps are used to construct a 2D optical switch on a single substrate. In a typical optical switch configuration, an array of hinged micromirrors are supported by an array of posts at a 45° angle to the input and output optical paths and positioned parallel to the substrate either above, below or, perhaps, in the optical paths. The application of a voltage between the mirror and its control electrodes switches the mirror to a vertical position where it intercepts and deflects light travelling down the optical paths. The posts are suitably oriented at a 90° angle with respect to the mirror hinges so that they do not interfere with the optical paths and, may be configured to function as baffles to reduce crosstalk between adjacent optical paths.

29 Claims, 17 Drawing Sheets

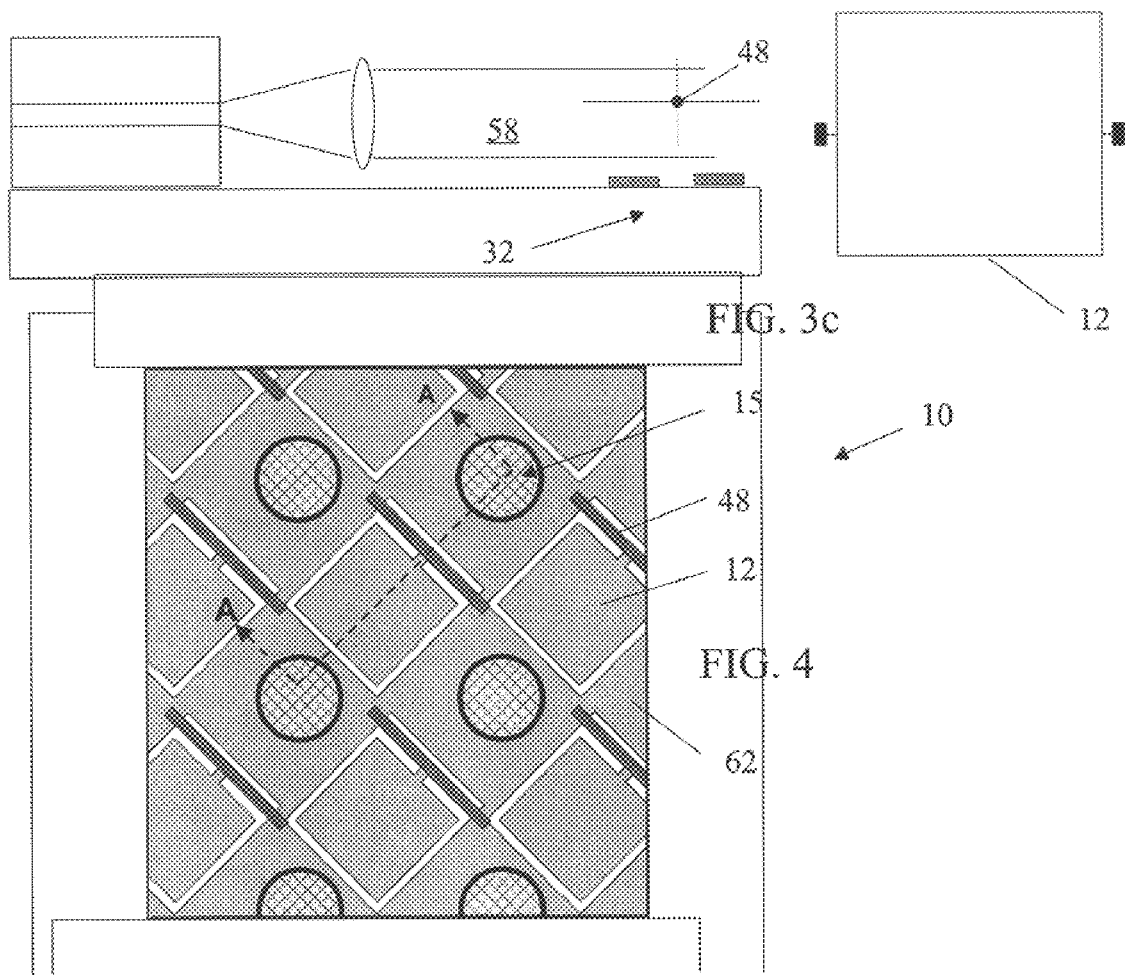

MONOLITHIC 2D OPTICAL SWITCH AND METHOD OF FABRICATION

Related Applications

Priority is claimed based on U.S. Provisional Application No. 60/129,337 entitled "Fiber Optic Crossbar Switch" filed Apr. 15, 1999, which is hereby incorporated by reference.

BACKGROUND OF THE INVENTION

1. Field of the Invention

This invention relates to optical switches and more specifically to a monolithic 2D optical switch using MEMS technology.

2. Description of the Related Art

The network of copper wires that has been the backbone of the telecommunications network is rapidly being replaced with a fiber optic network to increase the bandwidth available to support the Internet and other networking applications. To date, the majority of the original long haul telephone copper network has been replaced with an optical fiber network and network links within metropolitan areas are rapidly being replaced. While this copper to fiber replacement is proceeding at a breakneck pace, the demand for high bandwidth communication is so great that the rate of replacement will accelerate.

All communication networks, either copper or optical fiber, require switches that can route signals from source to destination as well as re-route signals in case of a fault or an excessive demand for a specific link. Presently the switching in "long haul" and "metro" segments of fiber optic networks is done electronically. The optical signals are converted into electronic signals and then electronic switching matrices, similar to the ones used in the original copper network, are used to accomplish the routing. After routing, the electronic signals are converted back to an optical signal and sent out through the designated fiber. This type of "optical" routing switch is large, expensive and inefficient. The electronic components of this type of switch are the major bottleneck in overall network throughput capacity.

The rapid growth in the number of fiber optic lines has created an urgent need for an all optical router; one that does not need to transform the signal into an electronic signal. An optical crossbar switch, routes N incoming fiber optic channels to N outgoing fiber optic channels by selective actuation of a micro-mirror array to alter the desired light paths. These MEMS based optical crossbar switches should be capable of routing more channels on a single device, and be far cheaper and more compact than opto-electronic switches.

To date MEMS crossbar switches have not fulfilled their promise. The current switch designs and the limited manufacturing yields have constrained the size of useful devices typically to 2×2. Although these small devices can be cascaded together to form a larger device, such a cascaded configuration is complicated, lossy and very expensive. Some of the key problems have, and continue to be, the inability to precisely control the deflection angles of the micro-mirrors, to reduce the footprint of the actuation mechanism, and to monolithically fabricate the MEMS structures on an integrated circuit (IC).

Two main categories of MEMS optical crossbar switches exist. The first is based on sliding a vertical mirror in and out of a light path to perform a switching function. Lucent Technologies, Inc., U.S. Pat. No. 5,923,798 proposed an "in-plane" optical switch that includes an actuator comprising two vertically-oriented electrodes, and a linkage from the actuator to an optical device. As a voltage is applied across the electrodes, the movable electrode swings toward the fixed electrode. The horizontal displacement of the electrode is transferred to the optical devices which moves in-plane in or out of the optical path.

Lucent Technologies, Inc., U.S. Pat. No. 5,995,688, also proposed a micro-opto-electromechanical devices performing "on-off" switching function for only one optical channel. The MEMS device comprises an actuator that is mechanically linked to an optical interrupt (e.g., micro-mirror). The first end of the linkage underlies and abuts a portion of movable plate electrode, and a second end of linkage supports optical interrupter. The interrupter is a vertically assembled mirror that is attached to the linkage. When a voltage is applied across plate actuator, an electrostatic attraction causes a vertical or out-of-plane motion to linkage such that optical interrupter moves "up-and-down". In an actuated state, the device causes the optical interrupt of an optical signal. This device can be practically used only as one channel chopper.

The second category of switches, which is also the subject of this patent, is based on hinged mirrors that can be rotated out of the plane of the substrate to a vertical position to perform the switching function by selectively blocking the light path. Various mechanisms exist to provide the actuation force necessary to rotate the hinged mirrors including magnetic, thermal and electrostatic. Electrostatic actuation includes both lateral comb drive (in-plane) actuation and parallel-plate (out-of-plane) actuation. Lateral comb drives are used in combination with scratch drives, stepper motors, linear micro-vibrometers and micro-engines.

H. Toshiyoshi et al. "Electrostatic micro torsional mirrors for an optical switch matrix," IEEE J. Microelectromechanical System, Vol. 5, no. 4, pp. 231–237, 1996 describes a free-space optical switch based on parallel-plate actuation. The device is composed of two parts: torsion mirror substrate (a) and counter electrode substrate (b). As shown in FIG. 5, a bulk micromachining process is used to fabricate the mirror substrate in which a matrix of micro mirrors are supported by torsion beams across respective through-holes etched into the backside of the substrate. Bulk micromachining is relatively slow, expensive, provides only nominal control of mirror thickness and flatness, and is not compatible with IC fabrication processes yet. The mirror and counter electrode substrates are manually aligned by microscope observation and fixed by putting epoxy glue on the edge.

Application of a bias voltage to the mirror and counter electrodes attracts the mirror inward by 90° to reflect the incident light. The incident and redirected lights can propagate through the deep grooves formed on the backside of the substrate; i.e., the mirrors are located at the crossings by 45° inclination to the grooves. The angle of the mirror in the ON-state (90°) is controlled because it touches a mechanical stopper on the counter substrate.

The stiction force between the mirror and stopper creates a hysteresis whereby the applied voltage can be reduced and yet be able to hold the mirror in the ON-state. The spring force of the hinged mirror must be sufficient to overcome the stiction force when the holding voltage is completely removed in order to return the mirror to the OFF-state. Consequently, the applied voltage must be sufficient to overcome the mirror's spring force to drive the mirror to the ON-state, approximately 100–150V, which is not compatible with either standard IC processing or off-the-shelf driver chips.

Although the switch configuration may, in theory, be extended to arbitrary sizes it will in practice be limited to small devices on the order of 2×2. The combination of a mechanical stop, bulk processing and manual assembly of the mirror and counter electrode substrates limits the precision of the mirror deflection angle in the ON-state. The small (input) acceptance angle of the output fiber forces a high degree of precision on the deflection angle. This in turn determines the maximum path length between an input fiber and an output fiber, hence the array size. In addition, array size is limited by space considerations owing to the fact that a lead must be provided for each mirror in each row or column and the actuator footprint.

SUMMARY OF THE INVENTION

In view of the above problems, the present invention provides a free-space micromachined 2D optical switch with improved precision, hence larger array sizes at lower cost, whose fabrication is compatible with standard IC fabrication. The 2D optical switch will find particular use in an all-optical fiber network and, even more specifically, in the last mile of the network.

This is accomplished using a sequence of MEMS processing steps to construct on a single substrate an array of hinged micromirrors that are supported by an array of posts to allow deflection of the mirrors through approximately a 90° rotation under the influence of an electrostatic field between the mirrors and their underlying control electrodes.

In a typical optical switch configuration the mirrors are oriented at a 45° angle to the input and output optical paths and positioned parallel to the substrate either above, below or, perhaps, in the optical paths. The application of a voltage between the mirror and its control electrodes switches the mirror to a vertical position where it intercepts and deflects light travelling down the optical paths. Reproducibly accurate positioning of the mirrors requires either the use of active positioning control or of mechanical stops. The posts are suitably oriented at a 90° angle with respect to the mirror hinges so that they do not interfere with the optical paths and, may be configured to function as baffles to reduce crosstalk between adjacent optical paths.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a, 3b and 3c are simplified diagrams of three different designs for the monolithic 2D optical switch based on the location of the mirror hinge above, below and within the optical path, respectively;

FIG. 4 is a plan view of the design illustrated in FIG. 3a;

DETAILED DESCRIPTION OF THE INVENTION

The present invention provides a free-space monolithic micromachined 2D optical switch with improved precision, hence larger array sizes, at lower cost whose fabrication is compatible with standard IC processes. The switch is monolithically fabricated on a single substrate, in which the mirrors are suspended from an array of posts for rotation between horizontal and vertical positions. Monolithic fabrication will reduce cost by improving yield and improve performance by avoiding the assembly requirements associated with two substrates. Reproducibly accurate positioning of the mirrors requires either the use of active positioning control or of mechanical stops. Latched, tapered and split-electrodes can be used to provide precision control of the free-space micromachined mirrors required by both smaller, less expensive switches and larger, more expensive switches, respectively. The 2D optical switch will find particular use in an all-optical fiber network and, even more specifically, in the last mile of the network.

Figure 1A:
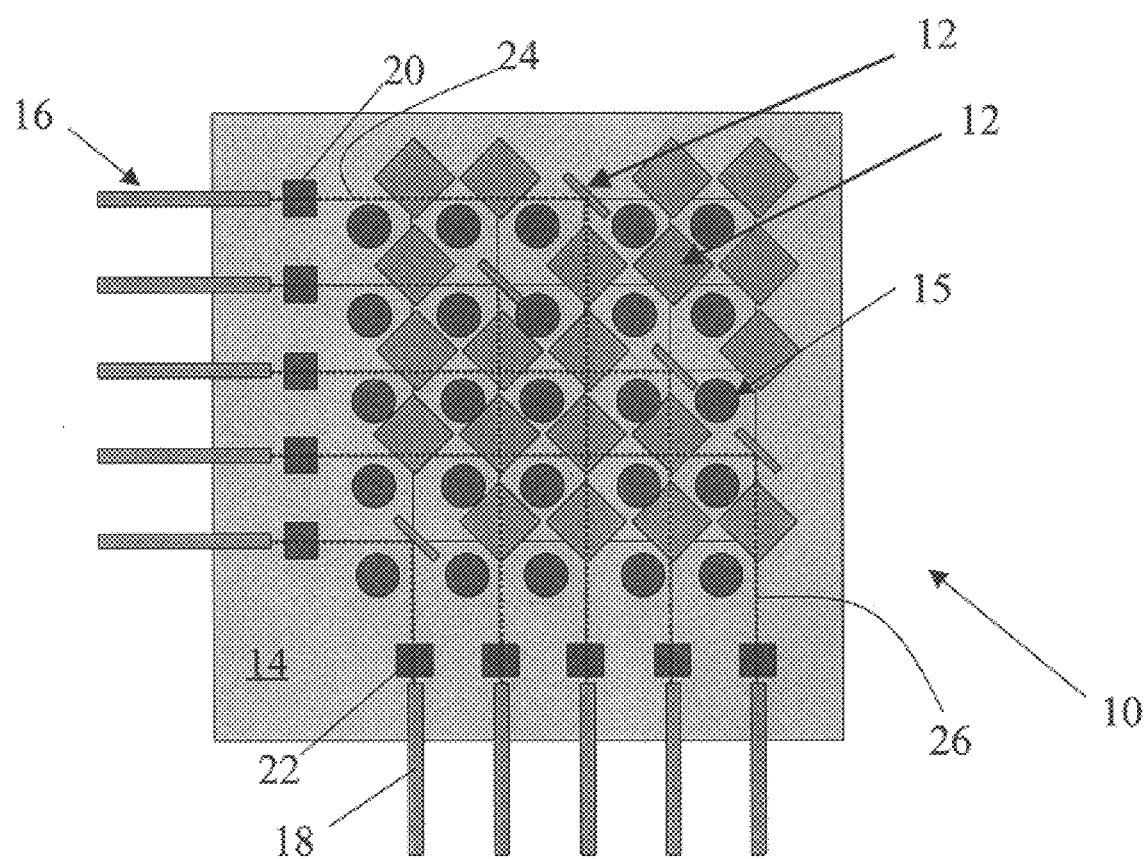
FIGS. 1a and 1b are respectively plan and partial perspective views of a monolithic 2D optical switch in accordance with the present invention.
Figure 3A:
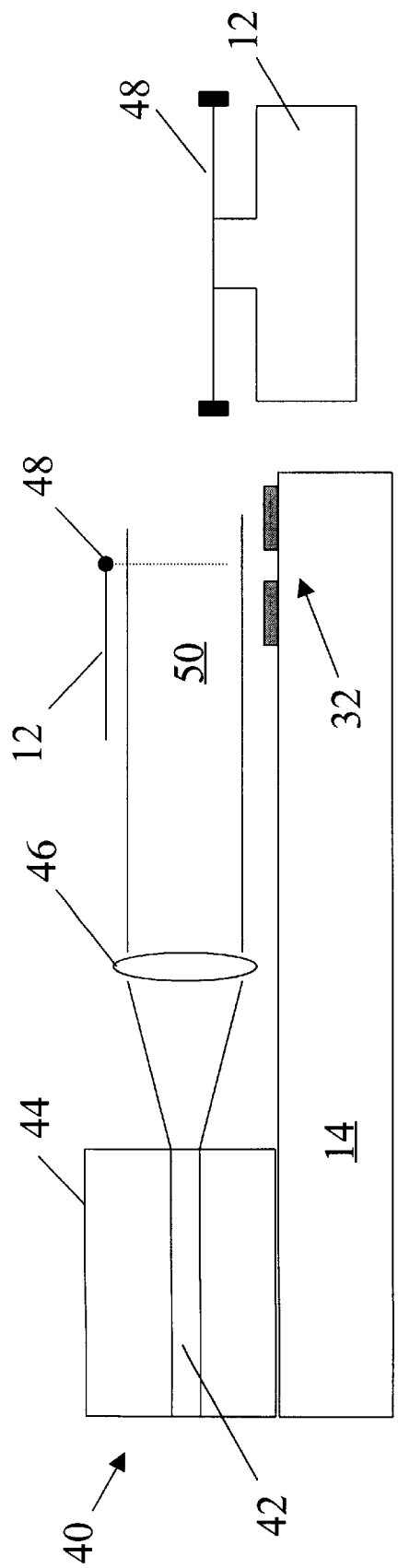
Figure 3B:
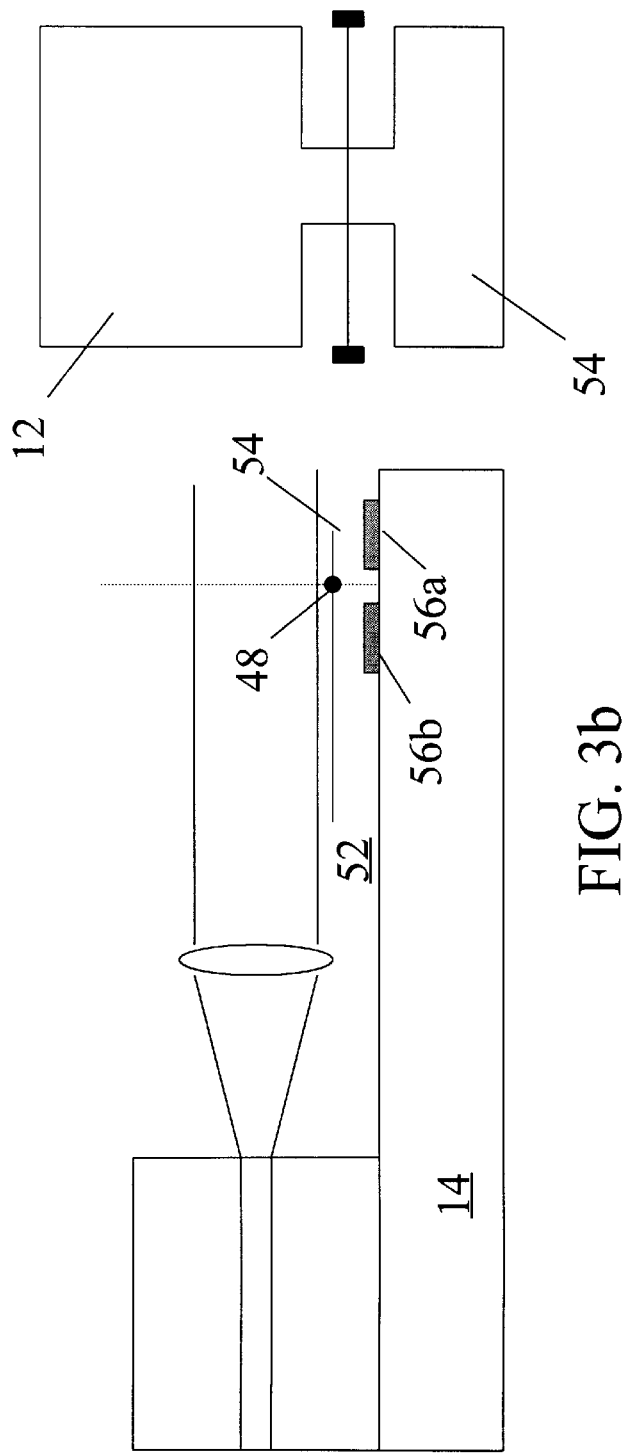

Turning now to the drawings, and referring first to FIG. 1a, a monolithic MEMS design for an NxM optical switch 10 includes a matrix of micromachined mirrors 12 arranged in a crossbar configuration on a single substrate 14. Mirrors 12 are supported by an array of posts 15 and positioned at 45° relative to the input and output fibers 16 and 18, respectively, and their collimating lenses 20 and 22. Posts 15 provide a conductive path between the mirrors and underlying reference electrodes (not shown) to hold the mirrors at reference potential. Posts 15 are preferably positioned at 90° relative to mirrors 12 such that the posts do not interfere with light travelling to and from the fibers along input and output optical paths 24 and 26, respectively. In their undeflected state, mirrors 12 lie in a plane above, below or perhaps in the input and output optical paths 24 and 26, respectively, (as best illustrated in FIGS. 3a–3c). Once flipped vertically by control electrodes (not shown) on the same substrate, a mirror intercepts the input optical path 24 and reflects the collimated light along one of the output optical paths 26 to an output fiber 18.

Figure 1B:
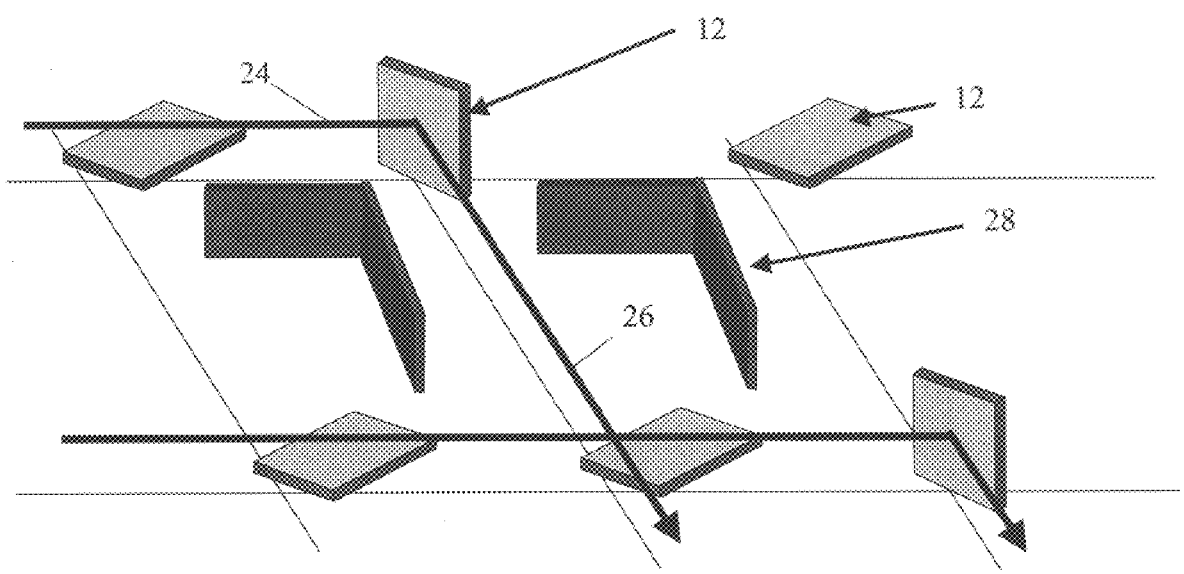

Accuracy of the mirror angle in the vertical position is a major challenge to the efficacy of this design. Assuming that the fiber/lens arrays are perfectly orthogonal, all mirrors must have the same vertical angle to achieve a low insertion loss. Monolithic fabrication greatly enhances the accurate positioning of the mirrors with respect to the control electrodes. For smaller array sizes, a latchable mirror may suffice. For larger array sizes, tapered or split-electrode arrays with active positioning control may be required to achieve reproducibly accurate positioning. Another major challenge is crosstalk between optical paths, which is addressed with the insertion of baffles 28 as best shown in FIG. 1b. The posts 15 may provide some or all of the baffle structure.

Figure 2:
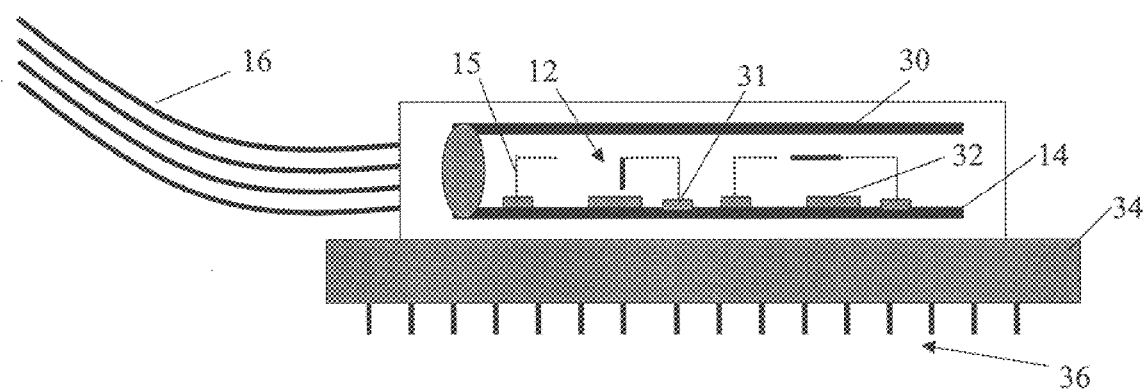
FIG. 2 is a perspective view of a packaged 2D optical switch.

As shown in FIG. 2, a packaged 2D switch includes input fibers 16 and output fibers (not shown) mounted between substrate 14 and a cover glass 30 for affecting respective optical signals travelling along respective input optical paths and for receiving respective optical signals travelling along output optical paths substantially orthogonal to the input optical paths. An array of micromachined mirrors 12 are supported by posts 15 on substrate 14 at the intersections of the input and output optical paths and oriented at approximately forty-five degrees to the paths. The posts are supported on reference electrodes 31 to hold the mirrors at reference potential, e.g. ground potential.

An array of control electrodes 32 are arranged on the substrate 14, which is mounted on an addressing chip 34 having I/O pins 36. Each control electrode is configured to receive a voltage and apply an electrostatic force that first rotates the mirror approximately ninety degrees into one of the input optical paths to deflect the optical signal along one of the output optical paths and then precisely maintains the desired mirror position. Reproducibly accurate positioning of the mirrors requires either the use of active positioning control or of mechanical stops. See for example, Behin et al. "Magnetically Actuated Micromirrors for Fiber-Optic Switching" Solid-State Sensor and Actuator Workshop, Hilton Head Island, S.C., June 8–11, pp. 273–276 and Gustafson et al. "Micro-Actuated Mirrors for Beam Steering" SPIE Vol. 3008, pp. 91–99, 1998, which are hereby incorporated by reference.

Three different designs for the monolithic 2D optical switch based on the location of the mirror hinge above, below and within the optical path, respectively, are illustrated diagrammatically in FIGS. 3a, 3b, and 3c. In each case, the 2D optical switch is built on a single substrate 14. A cover glass may be added for purposes of packaging but does not form an integral part of the switch. An optical device 40 such as a fiber is mounted on substrate 14. Fibers include a core 42 along which the beam travels and an outer cladding 44, which is much thicker than the core. For example, the outer cladding may be 125–500 microns compared to 5–10 microns for the core. The fiber is mounted on the substrate in such a manner to control the height of the light as it travels over the substrate. This is typically done using grooves to lower the optical paths but the fiber could just as well be raised on a pedestal. Light emitted from fiber 40 diverges until it is intercepted by a lens 46, which collimates the beam and directs it to the mirror array along input optical path 24. Another optical device is similarly mounted on the substrate in an orthogonal relationship to receive the beam of light along the output optical path.

As illustrated in FIG. 3a, the mirror hinge 48 is positioned above the optical paths at the intersection of the input and output optical paths such that an undeflected mirror 12 does not intercept the light beam as it travels to and from the switch. The mirror and mirror hinge are defined within a frame supported on the array of posts, which are carefully position on the substrate not to interfere with the optical paths. The array of posts and frame bound a cavity 50 between the mirrors and the substrate to allow deflection of the mirrors into the optical paths. Since the mirrors are held at reference potential by way of a conductive path through the posts to reference electrodes on the substrate, the application of voltage(s) to control electrodes 32 (latched, tapered or split) produces an electrostatic force that rotates mirror 12 about its hinge 48 to an approximately vertical position in cavity 50 to intercept the optical path and deflect the beam of light. As illustrated, the beam hits the top surface of the mirror. Alternately, the fibers could be oriented such that the beam hits the bottom surface of the mirror. The dimensionality of the array and the particular application will determine the precision with which the mirror must be deflected and maintained, which in turn will dictate the electrode configuration and addressing scheme. Because the optical switch is designed and fabricated monolithically the hinges and control electrodes are precisely aligned, which in turn improves deflection accuracy.

As illustrated in FIG. 3b, the mirror hinge 48 is positioned below the optical paths at the intersection of the input and output optical paths such that an undeflected mirror 12 does not intercept the light beam as it travels to and from the switch. In this case, the fiber may need to be raised slightly by reducing the groove depth or by using a pedestal. The array of posts and frame bound a cavity 52 between the mirrors and the substrate below the optical paths. Mirrors 12 are extended past hinges 48 to form a tab extension 54. The selective application of voltage(s) to control electrodes 32 produces an electrostatic force on tab extension 54 that rotates the tab extension downward into cavity 52 thereby rotating mirror 12 to an approximately vertical position to intercept the optical path and deflect the beam of light. For example, in a split-electrode configuration the application of a voltage to electrode 56a directly underneath tab extension 54 produces an unbalanced force on the mirror to initiate the desired rotation. Once the tab extension has rotated sufficiently, voltages are applied to both electrodes 56a and 56b to rotate the tab extension to its full ninety degrees and then maintain deflection within a specified tolerance.

As illustrated in FIG. 3c, the mirror hinge 48 is positioned within the optical paths at the intersection of the input and output optical paths such that an undeflected mirror 12 intercepts a small cross-section of the light beam as it travels to and from the switch. Whether the insertion losses associated with this particular configuration are acceptable will depend upon the specific implementation. The array of posts and frame bound a cavity 58 between the mirrors and the substrate that includes the lower half of the optical paths. Mirrors 12 are symmetrical about hinges 48. The selective application of voltage(s) to control electrodes 32 produces an unbalanced electrostatic force on mirror 12 that rotates one end of the mirror downward into cavity 58 thereby rotating the other end of mirror 12 to an approximately vertical position such that the mirror intercepts the optical path and deflect the beam of light. The electrode structure and actuation described above in reference to FIG. 3b would also serve to actuate the symmetric mirror.

Figure 5A:
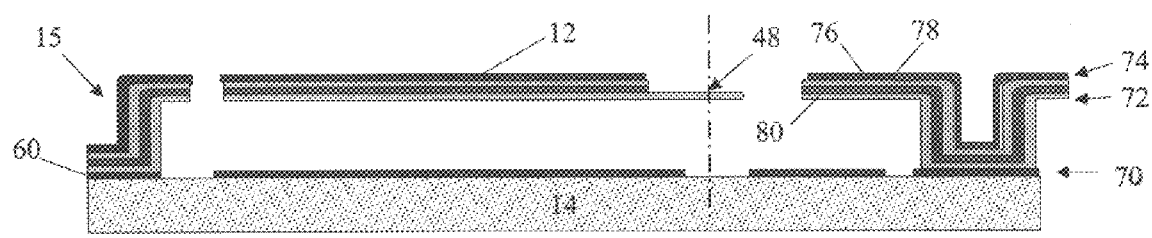
FIGS. 5a and 5b are sectional views taken along section lines A—A and B—B, respectively, in FIG. 4.
Figure 5B:
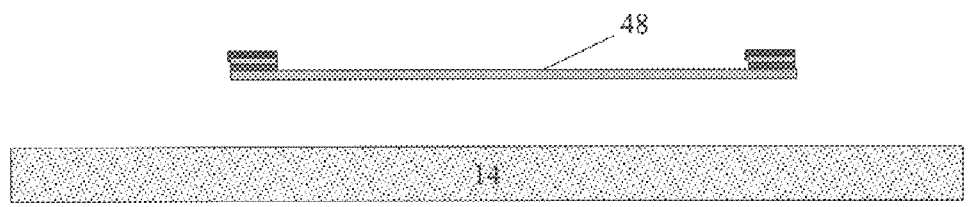

FIGS. 4 and 5a–5b illustrate a presently preferred physical implementation of the monolithic 2D optical switch 10 in which the mirror hinge 48 is positioned above the optical paths as illustrated in FIG. 3a. FIG. 4 is a plan view of the implementation and FIGS. 5a and 5b are sectional views taken through the mirror 12 and posts 15 orthogonal to the hinge 48 and through the hinge 48, respectively. Control and reference electrodes 32 and 60, respectively, are positioned on substrate 14 underneath mirrors 12 and posts 15, respectively. Posts 15 support a frame 62 that together support the mirrors above the optical paths and bound cavity 50 between the array of mirrors and substrate. Posts 15 are oriented at 90° with the respect to the hinges out of the optical paths and provide a conductive path between reference electrodes 60 and the mirrors so that the mirrors can be held at a reference potential. Frame 62 is patterned to define mirror hinges 48 and openings for the mirrors, and to generally provide structural stability to the mirror array. As configured, mirrors 12 lie in the plane of frame 62 above the optical paths. When a sufficient voltage is applied between a mirror and its control electrode, the mirror rotates about its hinge 48 under the influence of the electrostatic field between the mirror and its control electrode by approximately ninety degrees into the optical path to deflect the optical signal to the second optical device.

The various components of the switch 10 are formed on the substrate by adding successive layers of desired materials, and removing regions of certain of the layers in MEMS processing steps. In general, successive layers form the components described above including an electrode layer 70, a release layer (removed during release process), a support layer 72 and a mirror layer 74. Electrode layer 70 is a made of a conductive material such as aluminum for defining the array of control and reference electrodes. The release layer is made of a material that can be applied as a relatively thick layer to define the cavity, etched to define the post holes and released in a manner that does not stress the mirrors. In the present embodiment, the release layer is poly-methyl methacrylate (PMMA), which is dry released with an oxygen plasma. Support layer 72 is a made of a material such as Silicon that is strong yet compliant (to define the frame and hinges), sufficiently conductive (to provide the conductive path necessary for electrostatic actuation), does not exhibit a hysteresis (repeatable hinge response) and can be deposited to provide good step coverage (to define the posts). Mirror layer 74 is made of a material or materials that are reflective, strong and exhibit negligible stress gradient (to avoid curling the mirrors when released). For example, a composite mirror including a thin aluminum layer 76 on a structural layer 78 of Silicon Nitride would provide these properties.

In order to provide both a weak hinge and a stiff mirror, the mirror layer must be selectively etched in the presence of the hinge without damaging the hinge. This can be accomplished in a number of ways. With the layered structure shown in FIGS. 5a and 5c and materials described above, the mirror layer must include an etch stop layer 80 such as aluminum to stop the Silicon Nitride etch from attaching the Silicon hinge material. As mentioned previously, the input fibers can be reconfigured such that the light beam strikes the underside of the mirror. In this case the support layer is etched away beneath the mirror and etch stop layer 80 also functions as the mirror surface so that layer 76 can be eliminated. Alternately, the support and mirror layers could be formed of materials such that the mirror etch does not attack the hinge layer. For example, a thick aluminum or gold mirror (no Silicon Nitride) would avoid this problem.

Figure 6:
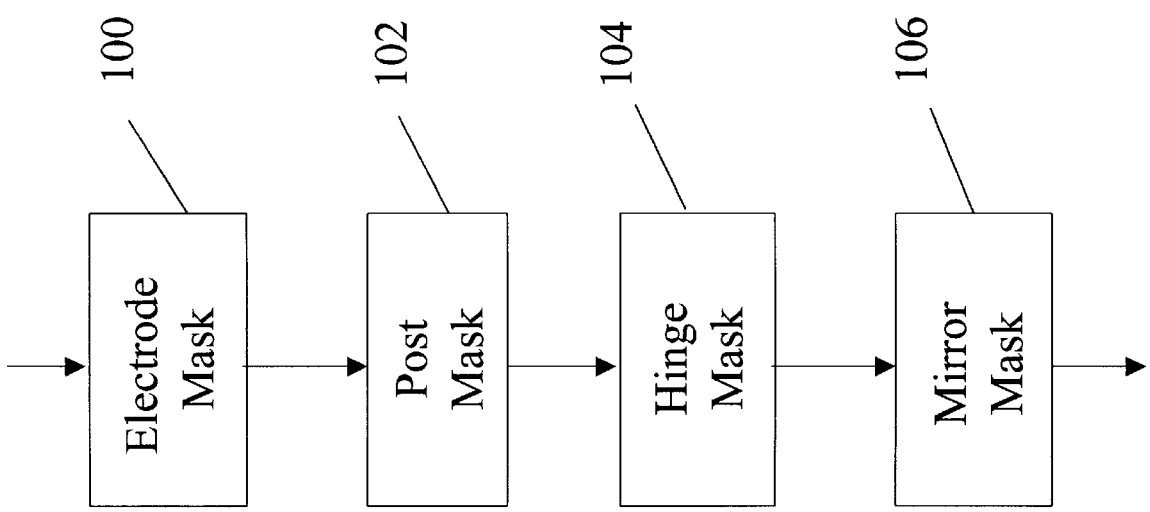
FIG. 6 is a flowchart describing the masking steps for fabricating the 2D optical switch.

The general sequence of MEMS processing steps is illustrated in FIG. 6. The processing sequence can be broken down into four masking steps. In step 100, a conductive layer is deposited and patterned using an electrode mask to form the control and reference electrodes on the substrate. In step 102, a release layer is deposited and patterned using a post mask to define the post holes over the reference electrodes. In step 104, the conformal support layer deposited over the release layer is patterned with a hinge mask to define the hinges. In step 106, a mirror layer is deposited and patterned to define the mirror array. Thereafter, the release layer is removed through a dry release process leaving the optical switch. One important aspect of the MEMS processing sequence is that it is a low temperature process and thus compatible with standard IC processing, which facilitates the integration of both the MEMS optical switch and control electronics on the same substrate.

Figure 7A:
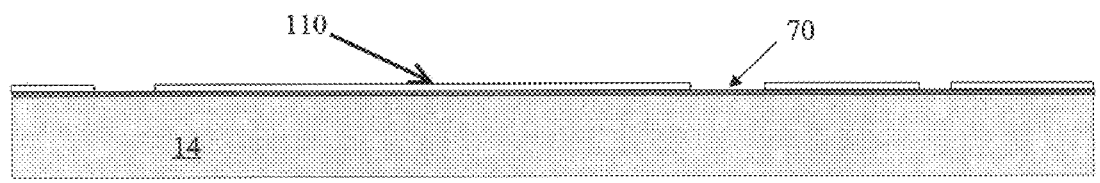
FIGS. 7a through 7i are sectional views taken along section lines 7—7 in FIG. 4 illustrating the sequence of fabrication steps.
Figure 7B:
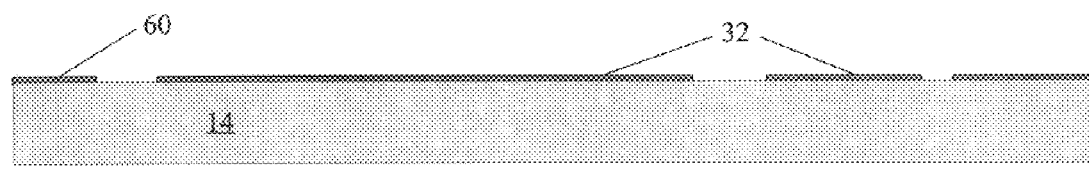
Figure 7C:
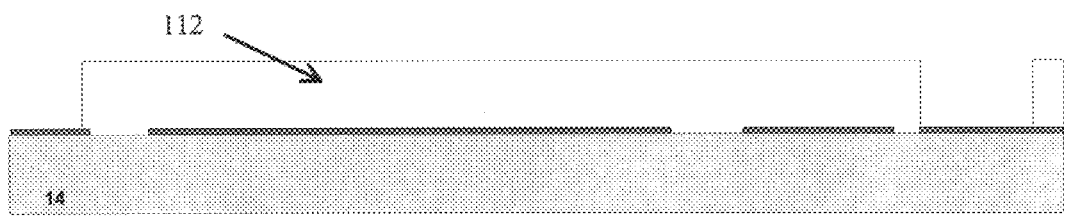
Figure 7D:
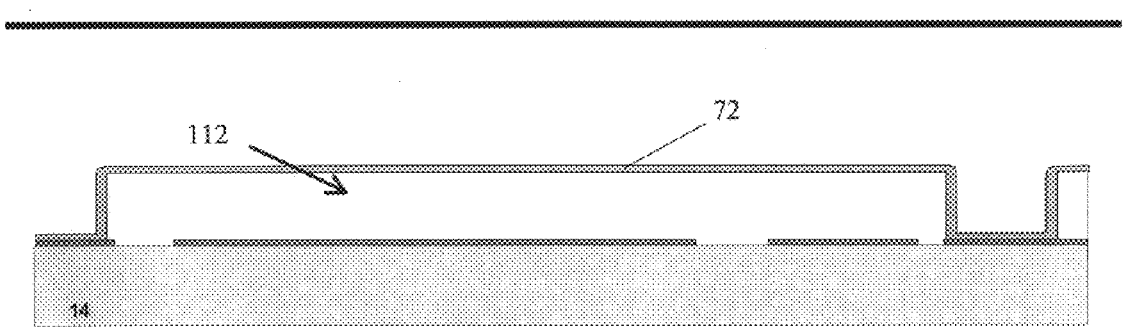
Figure 7E:
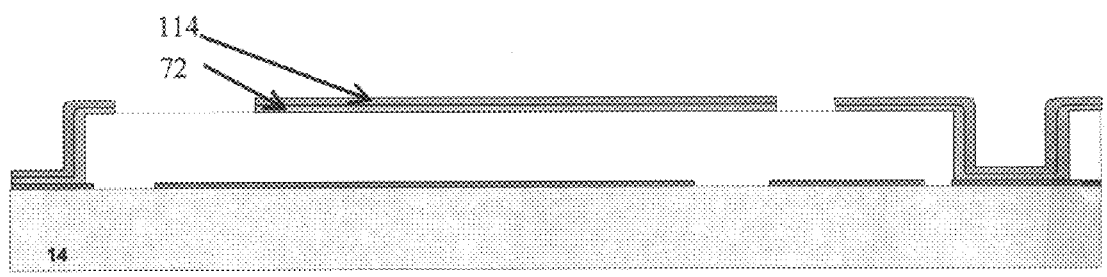
Figure 7F:
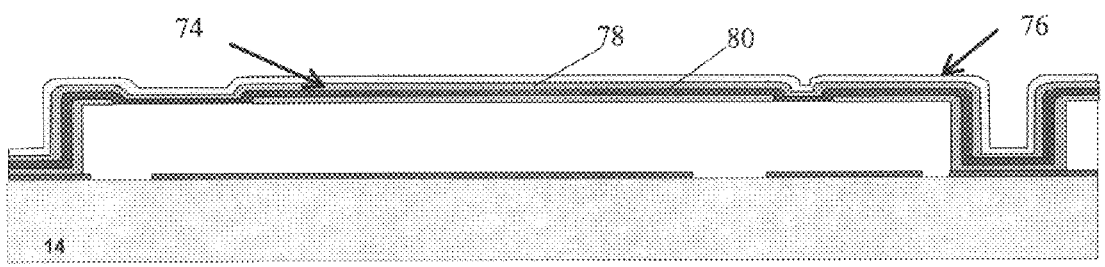
Figure 7G:
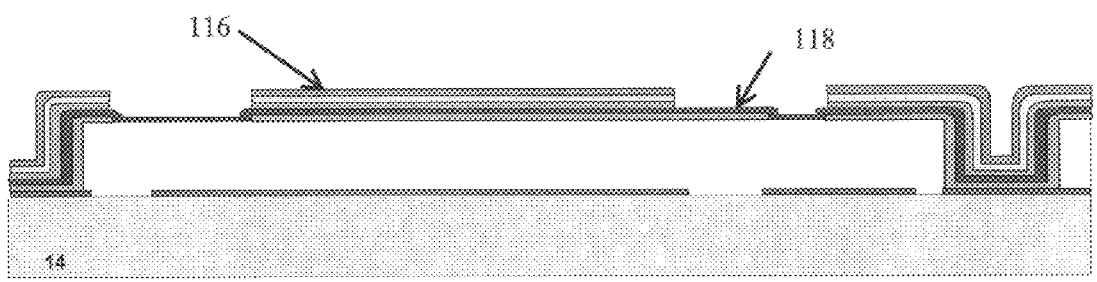
Figure 7H:
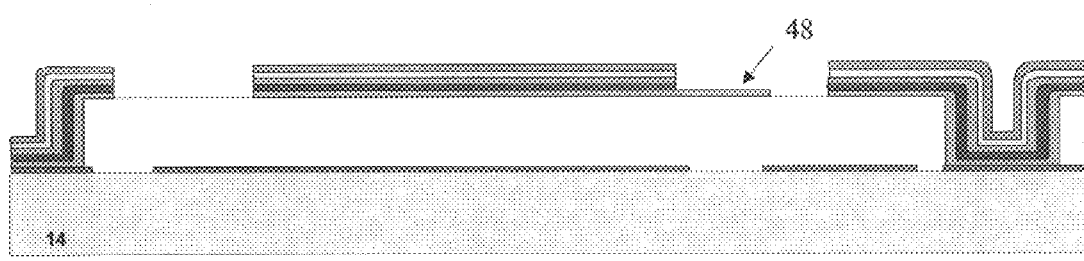
Figure 7I:
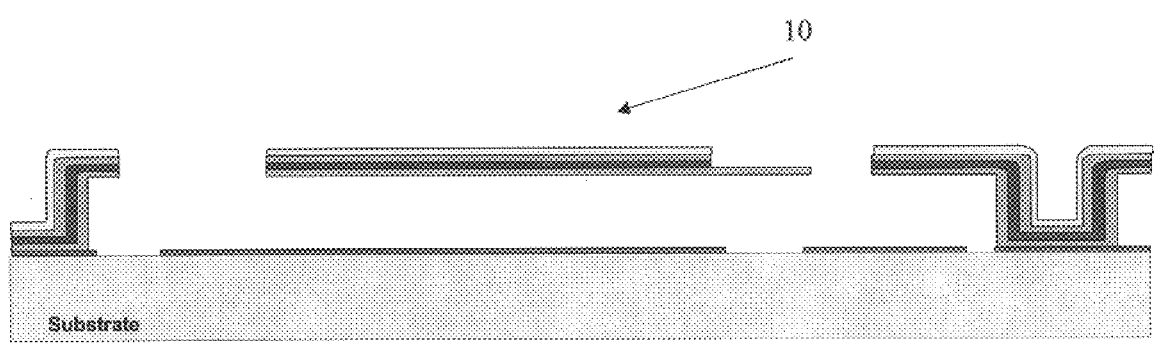

For purposes of illustration the specific sequence of four masking steps for the section of the switch shown in FIG. 5a is illustrated in FIGS. 7a–7i. As shown in FIG. 7a, a photoresist 110 on electrode layer 70, suitably 1000 Angstroms of aluminum, has been coated, exposed and developed to form the electrode mask. The exposed material is etched and the photoresist stripped away leaving the reference and control electrodes as shown in FIG. 7b. In FIG. 7c, a release layer 112, suitably 100 microns of PMMA, has been coated, exposed and developed with the post mask to define the post holes over the reference electrodes. These types of polymer materials may be deposited in relatively thick layers at low (IC compatible) temperatures in a spinning process. In FIG. 7d, the device has been coated with support layer 72, suitably 2400 Angstroms of silicon under tensile stress. A photoresist 114 is coated, exposed, and developed to create the hinge mask used to etch support layer 72 as shown in FIG. 7e. As shown in FIG. 7f, the device is coated with mirror layer 74, which in this embodiment includes etch stop layer 80, structural layer 78 and reflective layer 76 suitably 500 Angstroms of aluminum, 1.2 microns of Silicon Nitride and another 500 Angstroms of aluminum. The mirror layer is then selectively etched in the presence of the underlying hinge in three steps to avoid damaging the hinge. As shown in FIG. 7g, a photoresist 116 is patterned to define the mirror mask, which is used to etch away the exposed material in layer 76. The photoresist 116 and patterned aluminum provide a hard mask that is used to etch the Silicon Nitride. This etch is stopped by etch stop layer 80 before it can damage support layer 72. As shown in FIG. 7h, the exposed material in the etch stop layer is then removed using a process that does not attack the silicon support layer thereby leaving hinge 58 intact. Finally, the release layer 112 is stripped away using a dry release process (oxygen plasma) leaving the MEMS optical switch 10 shown in FIG. 7i.

Figure 8:
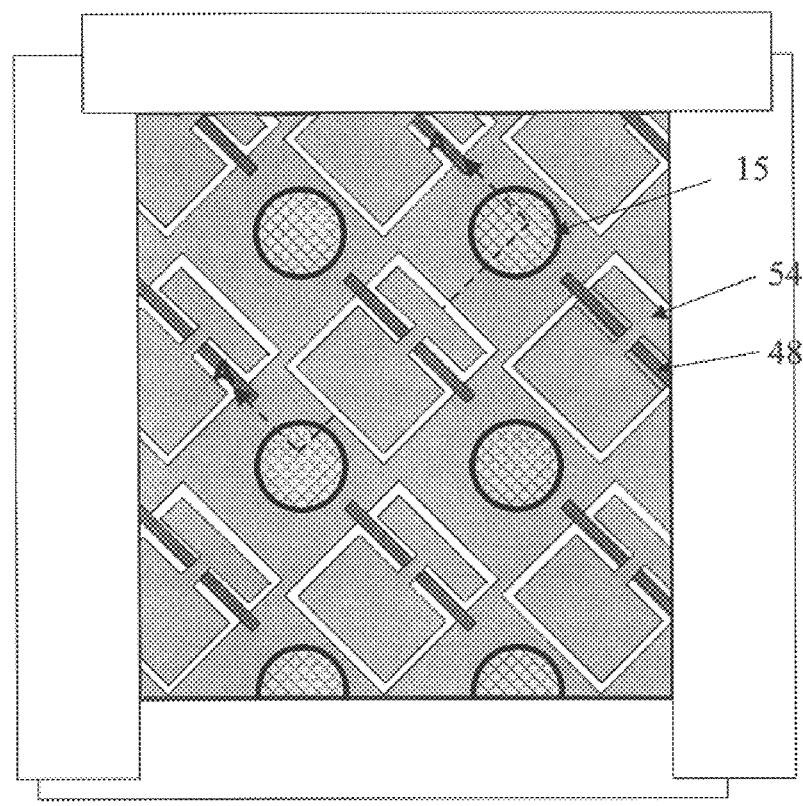
FIG. 8 is a plan view of the design illustrated in FIG. 3b.
Figure 9A:
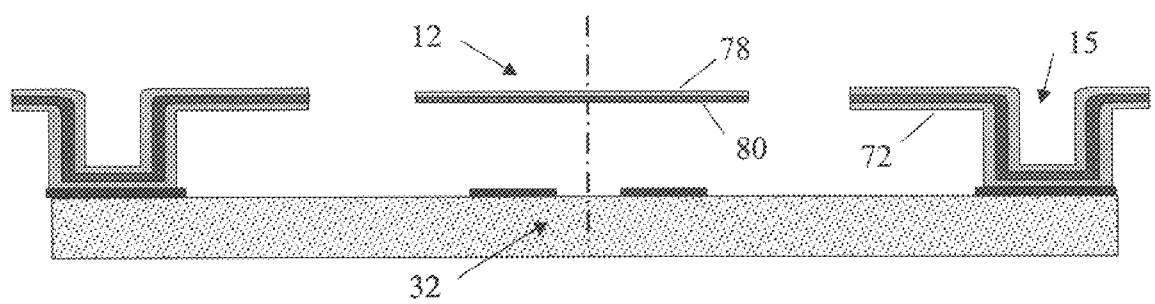
FIGS. 9a and 9b are sectional views taken along section lines A—A and B—B, respectively, in FIG. 8.
Figure 9B:
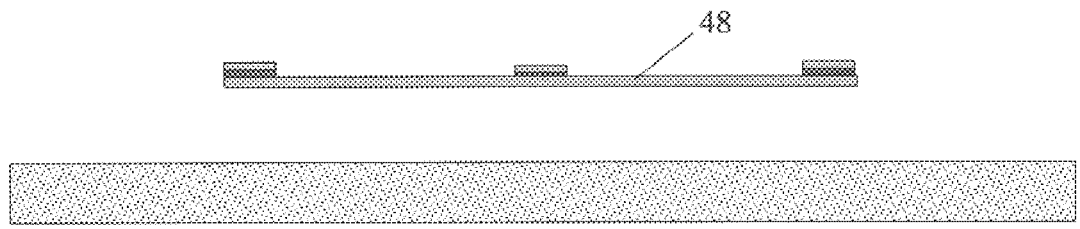

FIGS. 8 and 9a–9b illustrate a presently preferred physical implementation of the monolithic 2D optical switch 10 in which the mirror hinge 48 is positioned below the optical paths as illustrated in FIG. 3b. FIG. 8 is a plan view of the implementation and FIGS. 9a and 9b are sectional views taken through the mirror 12 and posts 15 orthogonal to the hinge 48 and through the hinge 48, respectively. This implementation is very similar to that shown in FIGS. 4 and 5 except that the hinge is located below the optical paths rather than above and the mirror is extended to form tab extension 54. In this particular configuration, etch stop layer 80 also provides the mirror surface and support layer 72 has been etched away beneath mirror 12. The sequence of MEMS processing steps is the same as described in FIGS. 6 and 7 except that the top aluminum layer is eliminated and the hinge material under the mirror is removed. As mentioned previously, the application of a voltage between the mirror and control electrodes 32 produces a force that rotates tab extension 54 downward such that mirror 12 intercepts the travelling beam.

Figure 10:
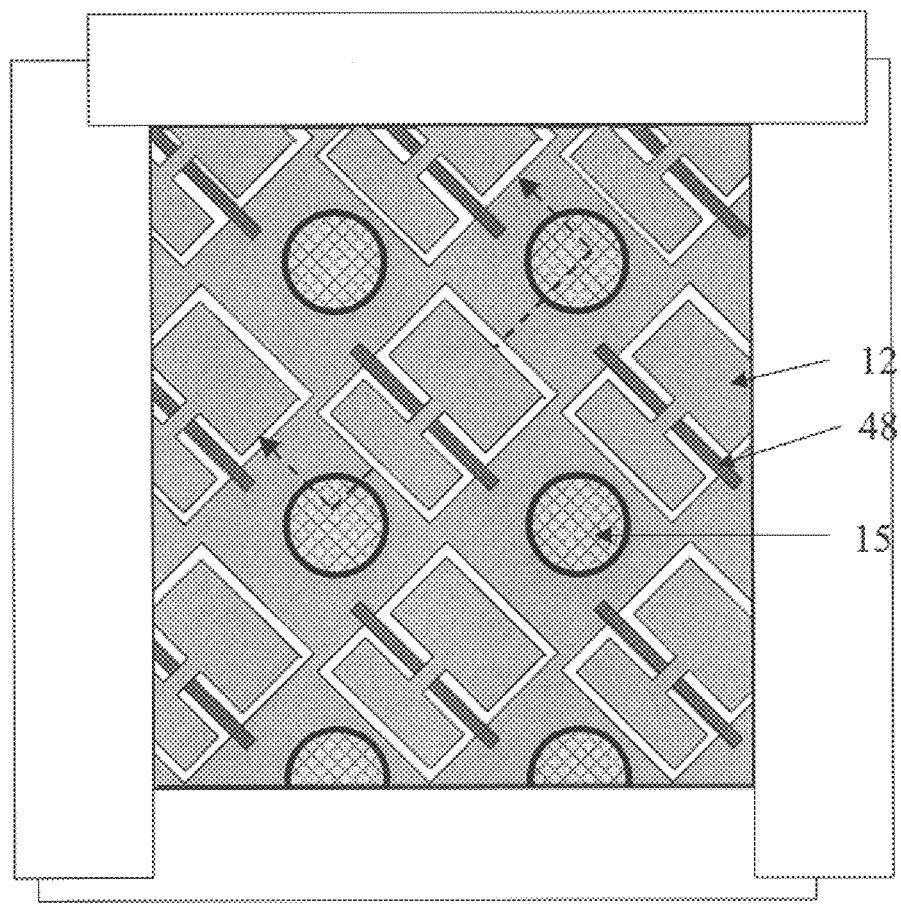
FIG. 10 is a plan view of the design illustrated in FIG. 3c.
Figure 11A:
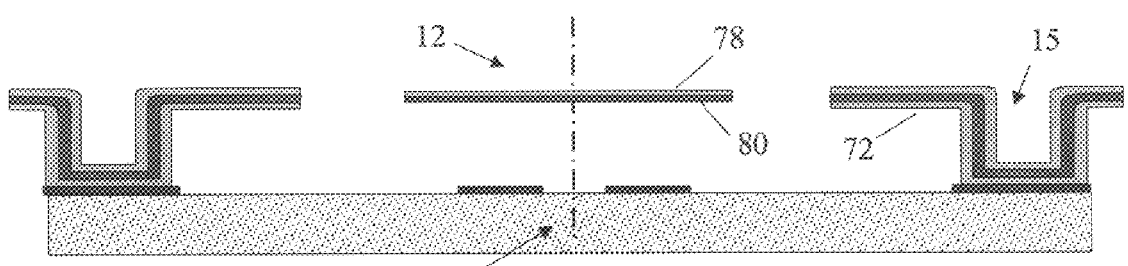
FIGS. 11a and 11b are sectional views taken along section lines A—A and B—B, respectively, in FIG. 10.
Figure 11B:
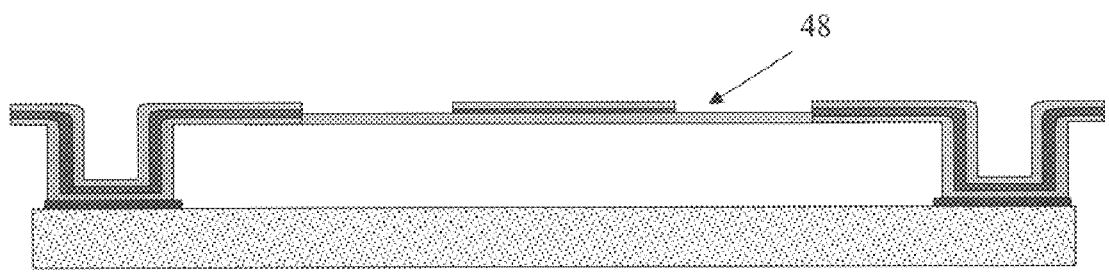

FIGS. 10 and 11a–11b illustrate a presently preferred physical implementation of the monolithic 2D optical switch 10 in which the mirror hinge 48 is positioned in the optical paths as illustrated in FIG. 3c. FIG. 10 is a plan view of the implementation and FIGS. 11a and 11b are sectional views taken through the mirror 12 and posts 15 orthogonal to the hinge 48 and through the hinge 48, respectively. This implementation is very similar to that shown in FIGS. 4 and 5 except that the hinge is located in the optical paths rather than above or below and the mirror is symmetric about its hinge. In this particular configuration, etch stop layer 80 also provides the mirror surface and support layer 72 has been etched away beneath mirror 12. The sequence of MEMS processing steps is the same as described in FIGS. 6 and 7 except that the top aluminum layer is eliminated and the hinge material under the mirror is removed. As mentioned previously, the application of a voltage between the mirror and control electrodes 32 produces a force that rotates one end of the mirror downward such that mirror 12 intercepts the travelling beam.

As discussed earlier, a number of different control electrode configurations may be used depending upon the size of the array, acceptable insertion losses and cost constraints. Split-electrode, tapered and latched configurations, which represent some but not all possibilities, are shown in FIGS. 12, 13 and 14, respectively.

Figure 12A:
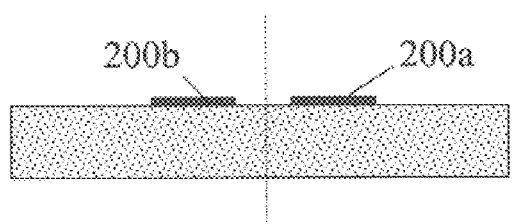
FIGS. 12 through 14 illustrate different control electrode configurations for use in the optical switch.
Figure 12B:
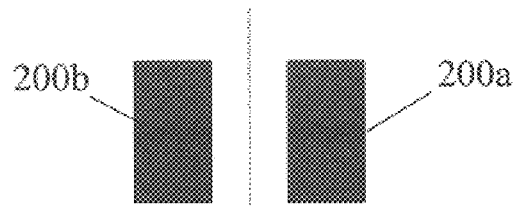

The split-electrode configuration shown throughout the description and again in FIGS. 12a and 12b includes a pair of electrodes 200a and 200b on the substrate underneath the mirror. The selective application of voltages to the pair of electrodes with the mirror held at a reference potential serves both to actuate the mirror approximately 90° and to trim the mirror position to maximize the optical power at the output fiber. First and second electrodes 200a and 200b, respectively, are suitably positioned at less than and greater than 90° with respect to the rotation of the mirror.

Accordingly, first electrode 200a is most effective during the initial raising of the mirror because it lies directly over the mirror. The first electrode's effectiveness diminishes to almost nothing as the mirror approaches 90°. Should the mirror rotate past 90° the first electrode is now effective to pull the mirror back to stabilize its position. Second electrode 200b begins to be effective about halfway, approximately 50°, and because it is placed beyond directly overhead continues to be effective past 90°.

The split-electrode configuration provides great flexibility for addressing the mirrors to both actuate the mirror to an approximately vertical position and then finely trim its position to optimize performance. In particular, the first electrode can be used to actuate the mirror and the second electrode used to maintain its position; the force produced by the second electrode balancing the spring force exerted by the mirror. Alternately, the pair of electrodes can be used to balance the forces on the mirror to maintain its position by either varying the voltages on both electrodes or varying the voltage on one electrode and leaving the other fixed. This approach should provide enhanced stability. In yet another configuration, the voltages on the first and second electrodes could be fixed (at different values) and the voltages on the mirrors (held at a reference level in previous embodiments) controlled to both actuate and maintain mirror position.

Figure 13A:
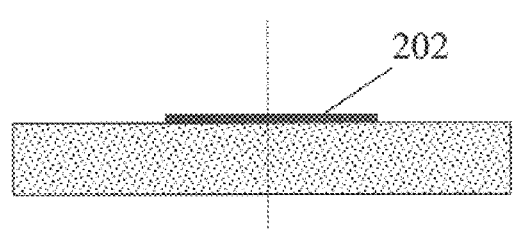
Figure 13B:
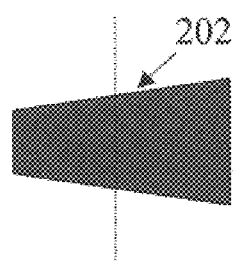

Another approach that can be used in a similar manner to that just described is a single "tapered" electrode 202 of the type shown in FIGS. 13a and 13b. By tapering the electrode, a single electrode can both rotate the mirror most of the way (near 90°) and then past 90°, which is required for precise control. The thin end of the electrode lies directly under the mirror so that it is effective in initiating deflection and rotating the mirror most of the way. Once the mirror is close to 90°, the wide end exerts a greater force on the mirror than the thin end so that the mirror continues past 90°. The elimination of one of the electrodes reduces the number of control lines that must be run from the addressing electronics to the electrodes by up to half. This configuration is particularly well suited for use with active positioning control.

Figure 14A:
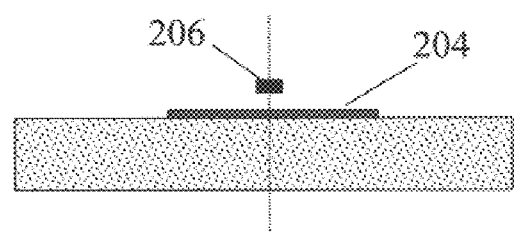
Figure 14B:
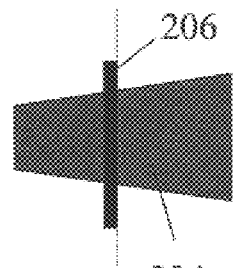

As illustrated in FIGS. 14a and 14b, a different approach is to use electrostatic forces to rotate the mirror but mechanical forces to hold the mirror. A number of configurations are possible that include a fixed or movable stop and one or more electrodes. The depicted embodiment uses a tapered electrode 204 of the type just described in combination with a compliant ribbon 206 that spans electrode 204. Tapered electrode 204 operates in the manner previously described to pull the mirror down past 90°. In addition, the mirror pulls ribbon 206 down to the substrate until mirror has rotated past 90° and then releases the ribbon causing it to snap back and catch the mirror at 90°. Unlike assembled optical switches, monolithic fabrication provides the necessary precision to align the hinge and ribbon such that the mirror is held within a tight tolerance around 90°. The mirror is released by applying voltages to the electrode, ribbon and mirror that produce a force that pulls the ribbon back down to the substrate thereby allowing the mirror hinge's elastic force to pull the mirror back up. The voltages must be applied such that any residual force between the electrode and the mirror is overcome by the hinge's elastic force.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A monolithic 2D optical switch, comprising:

a substrate;

an array of control electrodes and reference electrodes on said substrate and configured to receive actuation and reference voltages, respectively;

a micromachined frame suspended above the substrate by an array of posts on said reference electrodes;

an array of micromachined hinges supported by said frame; and an array of micromachined mirrors coupled to said hinges, said frame and posts providing a conductive path from said mirrors to said reference electrodes, each said mirror being configured to rotate under the influence of an electrostatic field between the mirror and its control electrode in accordance with said actuation and reference voltages.

2. The monolithic 2D optical switch of claim 1, wherein said frame and posts bound a cavity between the array of mirrors and the substrate, said mirrors rotating about their hinges downward into said cavity under the influence of the electrostatic field.

3. The monolithic 2D optical switch of claim 1, wherein said frame and posts bound a cavity between the array of mirrors and the substrate, said mirrors each comprising a tab extension that extends beyond the hinge, said tab extension rotating about its hinge downward into said cavity under the influence of the electrostatic field causing said mirror to rotate upward.

4. The monolithic 2D optical switch of claim 1, wherein said frame and posts bound a cavity between the array of mirrors and the substrate, said mirrors being symmetrical about their hinges, one end of said mirror rotating about its hinge downward into said cavity under the influence of the electrostatic field causing the other end of said mirror to rotate upward.

5. The monolithic 2D optical switch of claim 1, wherein said posts are oriented approximately orthogonal to said hinges.

6. The monolithic 2D optical switch of claim 1, wherein each said control electrode comprises a tapered electrode having a narrow end and a wider end that are positioned at less than and greater than a ninety degree rotation of the mirror, respectively.

7. The monolithic 2D optical switch of claim 6, wherein each said control electrode further comprises a compliant ribbon that spans the width of the tapered electrode directly beneath the hinge, said compliant ribbon flattening out to allow the mirror to rotate past ninety degrees and then snapping back to catch the mirror at approximately ninety degrees.

8. The monolithic 2D optical switch of claim 1, wherein each said control electrode further comprises a latch mechanism that allows the mirror to rotate past ninety degrees and catches the mirror at approximately ninety degrees.

9. The monolithic 2D optical switch of claim 1, wherein said mirrors are a composite structure comprising a structural layer and a reflective layer.

10. A monolithic 2D optical switch, comprising:
a substrate,
a plurality of input fibers mounted on said first substrate for affecting respective optical signals travelling along respective input paths,
a plurality of output fibers mounted on said first substrate for receiving respective optical signals travelling along respective output paths substantially orthogonal to said input paths,
an array of control electrodes and reference electrodes on said substrate and configured to receive actuation and reference voltages, respectively,
an array of posts on said reference electrodes, said posts lying outside said input and output paths,
a frame suspended above the substrate by the array of posts;
an array of hinges supported by said frame; and
an array of mirrors coupled to said hinges at the intersections of the input and output paths and oriented at approximately forty-five degrees to said input and output paths, said frame and posts providing a conductive path from said mirrors to said reference electrodes, each said mirror being configured to rotate under the influence of an electrostatic field between the mirror and its control electrode by approximately ninety degrees into the input path to deflect the optical signal along one of the output paths to the second optical device.

11. The monolithic 2D optical switch of claim 10, wherein said frame and posts bound a cavity between the array of mirrors and the substrate that includes the input and output paths, said mirrors rotating about their hinges downward into said cavity to intercept the input path and deflect the optical signal along one of the output paths to the second optical device.

12. The monolithic 2D optical switch of claim 10, wherein said frame and posts bound a cavity between the array of mirrors and the substrate that lies below the input and output paths, said mirrors each comprising a tab extension that extends beyond the hinge, said tab extension rotating about its hinge downward into said cavity under the influence of the electrostatic field causing said mirror to rotate upward to intercept the input path and deflect the optical signal along one of the output paths to the second optical device.

13. The monolithic 2D optical switch of claim 10, wherein said frame and posts bound a cavity between the array of mirrors and the substrate that intersects the input and output paths, said mirrors extending beyond their hinges so that one end of said mirror rotates about its hinge downward into said cavity under the influence of the electrostatic field causing the other end of said mirror to rotate upward to intercept the input path and deflect the optical signal along one of the output paths to the second optical device.

14. The monolithic 2D optical switch of claim 10, wherein said posts are oriented approximately orthogonal to said hinges and lie outside said input and output paths.

15. The monolithic 2D optical switch of claim 10, wherein each said control electrode comprises a tapered electrode having a narrow end and a wider end that are positioned at less than and greater than a ninety degree rotation of the mirror, respectively.

16. A monolithic 2D optical switch, comprising:
a substrate;
an electrode layer disposed over the substrate and forming an array of control and reference electrodes;
a mirror layer disposed over the substrate and forming an array of mirrors above their respective control electrodes; and
a support layer disposed between the mirror layer and the electrode layer, the support layer bounding a cavity between the mirror layer and the substrate to support the array of mirrors and provide a conductive path to the reference electrodes while allowing deflection of the mirrors under the influence of an electrostatic field between the mirrors and their underlying control electrodes.

17. The monolithic 2D optical switch of claim 16, wherein said mirror layer is a composite structure that includes a structural layer and a reflective layer.

18. The monolithic 2D optical switch of claim 17, wherein said mirror layer further comprises an etch stop layer.

19. The monolithic 2D optical switch of claim 18, wherein said reflective layer and said etch stop layer are the same layer.

20. The monolithic 2D optical switch of claim 16, wherein the support layer defines an array of hinges for rotating the mirrors.

21. The monolithic 2D optical switch of claim 20, wherein said mirrors rotate about their hinges downward into said cavity under the influence of the electrostatic field.

22. The monolithic 2D optical switch of claim 20, wherein said mirrors each comprise a tab extension that extends beyond the hinge, said tab extension rotating about its hinge downward into said cavity under the influence of the electrostatic field causing said mirror to rotate upward.

23. The monolithic 2D optical switch of claim 20, wherein said mirrors are symmetrical about their hinges, one end of said mirror rotating about its hinge downward into said cavity under the influence of the electrostatic field causing the other end of said mirror to rotate upward.

24. A method of fabricating a monolithic 2D optical switch on a single substrate, comprising:
depositing a conductive layer on the substrate;
patterning the conductive layer to form an array of control and reference electrodes;
depositing a release layer over the substrate;
patterning the release layer to define an array of post holes above the reference electrodes;
depositing a support layer to form an array of posts in said post holes and a frame above said substrate;
patterning the support layer to form an array of hinges;
depositing a mirror layer;
patterning the mirror layer to form an array of mirrors coupled to respective hinges; and releasing said release layer such that the array of posts and frame bound a cavity between the mirror layer and the substrate that allows deflection of the mirrors under the influence of an electrostatic field between the mirrors and their underlying control electrodes.

25. The method of claim 24, wherein the sequence of steps are compatible with fabricating integrated circuits (ICs) on the same substrate.

26. The method of claim 24, wherein the release layer is a polymer that is released with a dry etch process.

27. The method of claim 26, wherein the polymer is PMMA and is released in an oxygen plasma.

28. The method of claim 24, wherein the mirror layer is selectively patterned in the presence of the underlying hinges without damaging the hinges.

29. The method of claim 28, wherein the mirror layer comprises a reflective layer and a structural layer, said mirror layer being patterned by first patterning the structural layer down to the reflective layer, which acts as an etch stop to protect the support layer, and then patterning the reflective layer.

* * * * *